Figure 1:
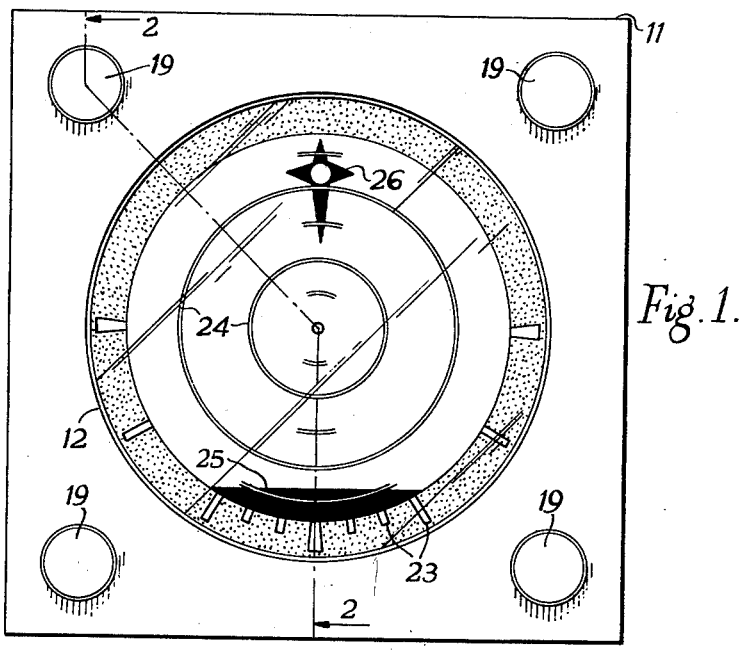

May 16, 1961  F. TYLER ET AL  2,984,206
INDICATORS
Filed Nov. 18, 1957

F. TYLER &
G. WIKKENHAUSER
INVENTORS

ATTORNEYS

United States Patent Office 2,984,206
Patented May 16, 1961

2,984,206
INDICATORS

Frank Tyler and Gustav Wikkenhauser, Barkingside, England, assignors to Kelvin & Hughes Limited, Hillington, Glasgow, Scotland, a British company Filed Nov. 18, 1957, Ser. No. 697,051

Claims priority, application Great Britain Nov. 16, 1956

13 Claims. (Cl. 116—129)

The present invention relates to indicators and is particularly but not exclusively concerned with aircraft attitude indicators.

It is currently the practice to provide an indication of the degree of pitch and bank of an aircraft by means of the well known artificial horizon type of apparatus in which the horizon is represented by a bar element which moves with respect to the instrument up and down with changes in pitch and rotates with changes in bank.

In apparatus which has been proposed, the bar element is formed by a straight line drawn across a white blind, which is wound up and down in dependence upon the pitch of the aircraft and is rotated as a whole about an axis perpendicular to the plane of the blind in dependence upon the angle of bank of the aircraft. The blind is located behind a glass plate upon one surface of which a series of concentric circles is drawn, the circles corresponding to 15, 30, 45, 60 and 75 degrees of pitch respectively. The blind is illuminated by a light source located behind the glass plate and is viewed through the glass plate, the concentric circular markings on the glass plate being silhouetted against the blind. It is arranged that in normal level flight the line on the blind when viewed through the glass plate, is horizontal and passes through the common centre of the cencentric circles of the glass plate. When the aircraft pitches nose down, the bar element rises with respect to the markings on the plate, and when the aircraft has pitched nose down through an angle of 15 degrees the line on the blind intersects the 15 degree pitch circle tangentially at its uppermost point. When the aircraft banks, left wing down, the blind as a whole rotates relatively to the indicator mounting through the same angle as that through which the aircraft has banked, but in the opposite sense. The line on the blind thus constitutes an artificial horizon.

In apparatus which has been proposed, the blind is illuminated by light directed thereon from one or more sources arranged in front of and near the edges of the blind. A disadvantage of this arrangement is that illumination is not uniform over the viewed blind, the intensity of illumination being less in the central region of the blnd than at the edges.

It is one object of the present invention to provide an illuminating arrangement in an indicator, by means of which the aforesaid disadvantage is substantially overcome.

According to one aspect of the present invention, there is provided an indicator including a first member located behind a generally transparent or translucent second member, the second member being so shaped that the surface thereof adjacent the first member is a convex surface, and lighting means arranged near the periphery of the second member in such a manner that, in operation, part of the light therefrom illuminates the first member directly, and a further part strikes the convex surface of the second member and is reflected thereby further to illuminate the first member. The part of the light directed on to the first member by reflection from the convex surface of the second member serves mainly to illuminate a central region of the first member, whereas the part of the light striking the first member directly serves mainly to illuminate the outer regions thereof. In this way, the illumination of the first member is made substantially uniform.

The first member may simply serve to provide background illumination for a pointer movable in a region between the first and second members, readings being taken against markings provided on one or the other of the two members.

On the other hand, the first member may be provided with one or more markings and be movable relatively to the second member, readings then being taken against one or more markings provided on the second member.

In a preferred embodiment of the invention, the second member is provided with markings on one surface thereof, and another part of the light from the said lighting means is transmitted through the body of the second member from the periphery thereof by multiple internal reflections to illuminate the marking or markings on the said one surface of the second member.

In an embodiment of the invention hereinafter to be described in detail, the indicator is an aircraft attitude indicator. The second member is a dished circular glass plate of uniform thickness, the convex surface of which bears the concentric circular pitch markings, and the illumination is provided by four light sources, one at each corner of a square framework supporting the glass plate. The first member is constituted by a roller blind carrying a marking representing an artificial horizon.

In the aforesaid proposed aircraft attitude indicator, a black line on the blind constituted the artificial horizon. It is, however, an advantage to employ an artificial horizon in which a large region of the blind below the horizon line is black, the black region then representing the earth and the white region the sky.

A disadvantage of employing such an artificial horizon is that when the markings on the glass plate are black they show up only against the white region of the blind. On the other hand, when the markings are white they show up only against the black region of the blind.

According to the preferred embodiment of the present invention, the marking or each of said markings on the first member is formed by two juxtaposed regions of the first member which contrast when viewed through the second member, and wherein the marking or each of said markings on the second member comprises two juxtaposed regions, one of which contrasts with one of the regions of the first member when the first member is viewed through the second member and the other of which contrasts with the other of the regions of the said first member when the said first member is viewed through the second member. The first member is preferably opaque and the two regions thereof black and white respectively when illuminated. The markings on the second member, in this case, are also preferably opaque, and the two regions of each marking black and white respectively when illuminated.

Figure 2:
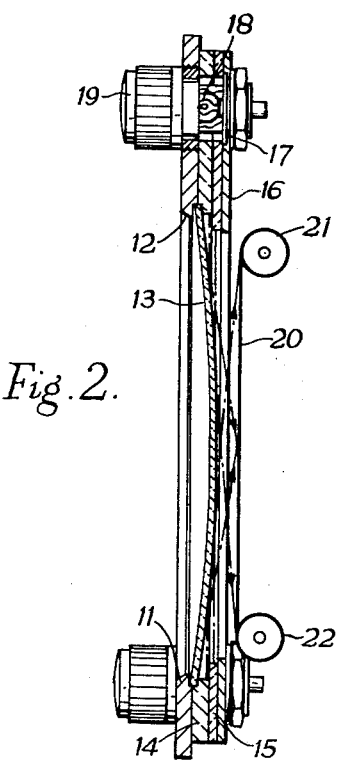

An embodiment of the present invention as applied to a roller blind aircraft attitude indicator will now be described by way of example with reference to the accompanying drawing in which:

Fig. 1 is a front view of a roller blind aircraft attitude indicator according to the present invention; and Fig. 2 is a cross-sectional side view of the indicator shown in Fig. 1, the section being taken along the line 2—2 in Fig. 1.

Referring to the drawing, there is provided a square opaque front plate 11 with a circular central opening 12. The rear edge of the circular opening 12 in the front plate 11 is recessed as shown in Fig. 2 and into this recess fits a circular dished glass cover plate 13 of uniform thickness, which is held in position by a light transmitting intermediate plate 14 having slightly smaller external dimensions than those of the plate 11 and having a corresponding central opening with a recessed front edge into which the cover plate 13 fits. The intermediate plate 14 is backed by a further light transmitting intermediate plate 15 of the same external dimensions as the plate 14 and with a slightly smaller central opening. In this embodiment the two intermediate plates are sheets of perspex. The intermediate plate 15 is backed by an opaque backing plate 16 of the same external dimensions as the intermediate plate 15 but with a slightly smaller central opening than that in the plate 15.

The front plate 11, the two intermediate plates 14 and 15 and the backing plate 16 are secured together by four clamping bolts (not shown).

The backing plate 16 is provided at each corner with an electric lamp mounting 17 secured in an opening therein. The front plate 11 and the two intermediate plates 14 and 15 have openings therein which register with the lamp mountings in the backing plate 16. An electric lamp bulb 18 is mounted in each lamp mounting 17 and extends through the registering openings in the two intermediate plates 14 and 15 and in the front plate 11. The registering opening in the front plate 11 is screw-threaded and a bulb cover 19 is screwed into it. The cover 19 serves to protect the bulb 18 and can be removed to gain access to the bulb for examination or replacement.

At the rear of the backing plate 16 there is mounted a roller blind 20 carried by rollers 21 and 22. The blind 20 is, in operation, automatically wound up and down in dependence upon the pitch of the aircraft in which the indicator is fitted and is rotated as a whole relatively to the assembly of plates 11, 14, 15 and 16 about an axis perpendicular to the plane of the blind in dependence upon the angle of bank of the aircraft.

The dispositions of the bulbs 18 are such that light from the filaments thereof passes through the two intermediate plates 14 and 15 to the edges of the central openings therein. Part of the light leaving the intermediate plates 14 and 15 at the central openings strikes the blind 20 directly. A further part of the light leaving the intermediate plates 14 and 15 strikes the convex surface of the glass cover plate 13 and is reflected thereby on to the blind 20.

The part of the light striking the blind directly serves mainly to illuminate the outer regions of the blind, whereas the part of the light which is reflected from the convex surface of the glass cover plate 13 serves mainly to illuminate the central region of the blind 20. In this way, the blind 20 is more evenly illuminated by the bulbs 18.

The amount of light striking the blind 20 directly is advantageously limited by providing the backing plate 16 with a slightly smaller opening than that of the intermediate plate 15.

Part of the light leaving the intermediate plate 14 at the central opening thereof passes into the glass cover plate 13 at the periphery thereof and is transmitted through the body of the plate 13 by multiple internal reflections. This part of the light so transmitted serves to illuminate markings on the convex surface of the glass cover plate 13.

Referring now to Fig. 1, the markings on the glass cover plate 13 comprise angle of bank markings 23 and pitch circles 24. The angle of bank markings 23 are short white markings extending radially from the centre of the glass cover plate 13 through a black annular region at the edge of the plate 13. The pitch circles 24 in order of increasing radius correspond to 15, 30, 45, 60 and 75 degrees of pitch respectively. Each pitch circle 24 comprises three juxtaposed annular regions, the two outer regions being black so as to show up against a white background and the intermediate region being white so as to show up against a black background.

The markings on the blind 20 comprise an artificial horizon 25 and an index mark 26 for use in vertical or near vertical ascent of the aircraft. The artificial horizon 25 is constituted by a horizontal line of demarcation between a lower black region 27 of the blind and an upper white region. The index mark 26 is constituted by a star-shaped black region in the white region of the blind.

As shown, the pitch circles 24 on the glass cover plate 13 show up against both the black and white regions of the blind 20. The black outer annular regions of the pitch circles 24 show up against the white region of the blind and the intermediate white regions of the pitch circles show up against the black regions of the blind.

It has been found advantageous to employ a red filter with each bulb, but clearly the same considerations apply to the use of red light as apply to the use of white light.

Furthermore, it has been found advantageous to employ a glass cover plate which has been lightly etched over its concave surface. Such a plate provides a more diffused light and lessens the glare caused by the glass cover plate reflecting light from external sources.

We claim:

1. An indicator instrument comprising a first member, a generally perspicuous cover member, and lighting means, said first member being constructed to indicate and located behind said cover member, said members having adjacent surfaces, said cover member being so shaped and postioned that the surface thereof adjacent the first member is a convex surface, and lighting means arranged near the periphery of the cover member to direct light between said first member and said cover member in directions generally parallel to said adjacent surfaces of said members in such a manner that, in operation, part of the light therefrom illuminates the first member directly and a further part strikes the convex surface of the cover member and is reflected thereby further to illuminate the first member.

2. An indicator according to claim 1, wherein said first member is provided with at least one marking and is movable relatively to the cover member, and said cover member is provided with at least one marking.

3. An indicator according to claim 1, wherein the cover member is provided with marking on a surface thereof and another part of the light from said lighting means is transmitted through said cover second member from the periphery thereof by multiple internal reflections to illuminate said marking on the cover member.

4. An indicator according to claim 2, wherein the marking on the first member comprises two juxtaposed regions of the first member which contrast when viewed through the cover member, and wherein the marking on the cover member comprises two juxtaposed regions one of which contrasts with one of the regions of the first member when the first member is viewed through the cover member and the corresponding region of which contrasts with the corresponding region of the first member when said first member is viewed through the cover member.

5. An indicator according to claim 4, wherein the first member is a roller blind extending between two spaced rollers and adapted to be wound up and down with respect to the cover member.

6. An indicator according to claim 5, wherein one of the markings on the first member is constituted by two juxtaposed light and dark regions of the blind having a horizontal line of demarcation representative of an artificial horizon.

7. An indicator according to claim 6, wherein said markings on the cover member are concentric rings each constituted by juxtaposed light and dark regions.

8. An indicator according to claim 1, wherein said cover member is in the form of a dished transparent circular plate.

9. An indicator according to claim 8, wherein the dished transparent plate constituting the cover member is of uniform thickness.

10. An indicator according to claim 3, wherein said lighting means comprises at least one light source and a light-transmitting member arranged near the periphery of the cover member to transmit light to the region of the periphery of the cover member.

11. An indicator according to claim 10, wherein said light-transmitting member is in the form of a plate having an opening therein, wherein the cover member fits into said opening, wherein said light source is located at the outer edge of said light-transmitting member and wherein the light transmitting member is provided with a central opening and a recess along the edge of the opening and said cover member is mounted in said recess.

12. An indicator according to claim 11, a blind for said cover member, backing plate means to limit the amount of light from said light transmitting member striking said blind directly, said backing plate means being located on the light-transmitting member adjacent said first member and having an opening therein registering with but smaller than the opening in said light-transmitting member.

13. An indicator instrument comprising a first member, a generally perspicuous second member having a periphery and lighting means, said first member being constructed to indicate and being located behind said second member, said members having adjacent surfaces, the surface of said second member adjacent said first member being convex, each said members having at least one marking thereon, said lighting means being positioned on said instrument near the periphery of said second member and so arranged that a first part of the light therefrom illuminates the first member directly, second part of said light strikes the convex surface of said second member and is reflected thereby to illuminate said first member, and a third part of the light is transmitted through said second member from the periphery thereof by multiple internal reflections to illuminate the marking on said second member, the marking on said first member comprising two juxtaposed regions of the first member which contrast when viewed through said second member, the marking on said second member comprising two juxtaposed regions so constructed that one of said second member regions contrasts with a corresponding one of said first member regions when the first member is viewed through the second member and the other of said second member regions contrasts with a corresponding one of said first member regions when said first member is viewed through said second member.

References Cited in the file of this patent

UNITED STATES PATENTS

| | | |
|---|---|---|
| 2,278,520 | Klein | Apr. 7, 1942 |
| 2,287,605 | Dickson | June 23, 1942 |
| 2,410,064 | Hardesty | Oct. 29, 1946 |
| 2,415,707 | Savage | Feb. 11, 1947 |
| 2,467,412 | Walthen | Apr. 19, 1949 |
| 2,515,199 | Draper | July 18, 1950 |
| 2,612,133 | Crawford | Sept. 30, 1952 |
| 2,681,977 | Ballard | June 22, 1954 |
| 2,782,395 | Hamond | Feb. 19, 1957 |
| 2,823,378 | Reedy | Feb. 11, 1958 |